United States Patent
Brown et al.

(10) Patent No.: US 6,313,057 B1
(45) Date of Patent: Nov. 6, 2001

(54) ALKALI RESISTANT SILICA REFRACTORY

(75) Inventors: John Thomas Brown, Corning; John F. Wosinski, deceased, late of Corning, both of NY (US), by Jean A. Wosinski, executrix

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/414,624

(22) Filed: Oct. 8, 1999

Related U.S. Application Data

(60) Provisional application No. 60/103,673, filed on Oct. 9, 1998.

(51) Int. Cl.[7] .............................. C04B 35/14; F27B 3/00; F27B 14/00
(52) U.S. Cl. .................. 501/123; 501/133; 501/154; 432/195
(58) Field of Search .................. 501/123, 133, 501/154; 432/195

(56) References Cited

U.S. PATENT DOCUMENTS

| | | | |
|---|---|---|---|
| 2,901,367 | * 8/1959 | Kraner | 501/133 |
| 3,144,345 | * 8/1964 | McCreight et al. | |
| 3,236,665 | * 2/1966 | King | 501/133 |
| 3,620,783 | * 11/1971 | Mahler et al. | |
| 3,684,538 | * 8/1972 | Wright | 501/133 |
| 3,788,866 | * 1/1974 | Flood et al. | 501/133 |
| 4,866,015 | 9/1989 | Koschlig et al. | 501/123 |
| 5,310,708 | 5/1994 | Harako et al. | 501/133 |
| 5,496,780 | 3/1996 | Ichikawa et al. | 501/133 |

FOREIGN PATENT DOCUMENTS

| | | | |
|---|---|---|---|
| 74-016087 | * | 4/1974 | (JP) . |
| 50-159503 | * | 12/1975 | (JP) . |

OTHER PUBLICATIONS

A. J. Faber and D. S. Verbeljen, Ceramic Engineering Science Proceedings 16(1) (1997), pp. 109–119, *Refractory Corrosion Under Oxy–Fuel Firing Conditions* (No Month).

* cited by examiner

*Primary Examiner*—David R Sample
(74) *Attorney, Agent, or Firm*—Patrick Pacella; Angela N Nwaneri

(57) ABSTRACT

A fused silica refractory material made from quartz grains and a method of making the material which contains calcium oxide binder in an amount less than one weight percent. The reduction in calcium oxide binder prevents the degradation of fused silica refractory bricks in furnace environments containing alkali vapors, such as in oxygen-fuel fired glass furnaces. The invention also includes a method of preventing the degradation of silica refractory material by alkalis.

1 Claim, No Drawings

ALKALI RESISTANT SILICA REFRACTORY

CROSS-REFERENCED APPLICATIONS

This application claims the benefit of U.S. Provisional Application, Ser. No. 60/103,673, filed Oct. 9, 1998, entitled "Alkali Resistant Silica Refractory", by John T. Brown and John F. Wosinski, Deceased.

FIELD OF THE INVENTION

The present invention relates to silica refractories and methods of producing the same. More particularly, this invention relates to silica refractory bricks and methods of producing silica refractory bricks that are resistant to degradation in alkali containing environments, such as oxygen-fuel fired furnaces.

BACKGROUND OF THE INVENTION

Silica bricks are used as a refractory in building and repairing industrial furnaces, including coke ovens, hot blast stoves and glass furnaces. U.S. Pat. Nos. 4,866, 5,310,708, and 5,496,780, which are incorporated by reference herein in their entirety, disclose the use and properties of silica refractory bricks.

There has been very little recent improvement in the manufacture of the conventional silica refractory manufactured for use in glass furnaces. Conventional silica bricks are typically manufactured by mixing quartz grains with calcium oxide binder, pressing the mixture into bricks and firing the bricks to temperatures up to 1700° C. to allow more than about 95% of the quartz to transform to cristobalite and tridymite. This transformation avoids the problems associated with expansion changes of alpha and beta quartz and allows for faster heating of the furnaces in which the brick is used. Conventional silica refractory bricks used in glass furnaces contain about 2.5% to 3% calcium which acts as a binder between the silica grains.

Environmental considerations, particularly the desire to lower the emission of nitrogen oxides from industrial furnaces, have driven the replacement of air-fuel firing of glass furnaces with oxygen-fuel firing. The change from air-fuel firing to oxygen-fuel firing has increased alkalis in the furnace environment, for example, sodium hydroxide in glass melting furnaces. Consequently, the increased alkalis in the furnace environment have caused additional corrosion of fused silica refractories. In some instances, the switch from air-fuel firing to oxygen-fuel firing increases the alkalis such as sodium hydroxide by a factor of four in the glass furnace.

Thus, alkalis in the furnace have been identified as being detrimental to silica refractory bricks. The crowns of glass furnaces are typically made of silica refractory bricks. The surface of an oxygen-fuel fired glass furnace crown made from silica refractory bricks can be degraded by about one to two inches per year. The typical life of a crown of a float glass furnace using oxygen-fuel firing is about seven years, which is a reduction of about five years compared with a furnace using air fuel-firing.

Alternatives to conventional silica refractories include alumina-zirconia-silica (AZS) refractories and amorphous silica refractories that do not contain any binder. However, one disadvantage with these alternative refractories is that they are much more expensive than the conventional silica refractory bricks made from quartz grains and contain calcium oxide binder.

There is a distinct need for a silica refractory that is resistant to alkali attack and degradation in oxygen-fuel fired furnaces, but is less expensive than AZS and amorphous silica refractory materials. It would also be advantageous to provide a refractory brick that could be utilized for long spans of glass furnace crowns and would require very little maintenance.

SUMMARY OF INVENTION

Accordingly, the present invention generally provides a new silica refractory made from quartz grains and containing calcium oxide binder in an amount less than one weight percent. Preferably, the calcium oxide binder is present in an amount between about 0.1 and 0.8 weight percent, and most preferably, the silica refractory contains between about 0.3 and 0.7 weight percent calcium oxide binder. The refractory bricks of the present invention are useful in glass manufacturing furnaces, particularly in the crowns of the furnace, and in furnaces that contain quantities of alkali vapors that are harmful to conventional silica refractories.

In another aspect, the invention includes a method of producing silica refractory brick made from quartz grains comprising adding less than one weight percent calcium oxide binder to the composition prior to firing of the brick to prevent degradation of the brick in a furnace containing alkali vapors, for example, and oxygen-fuel fired furnace. In a preferred embodiment of the present invention, the method involves adding between 0.1 and 0.8 weight percent calcium binder, and in a more preferred embodiment, the invention involves adding between 0.3 and 0.7 weight percent calcium oxide binder.

Additional features and advantages of the invention will be set forth in the description which follows. It is to be understood that both the foregoing general description and the following detailed description are exemplary and explanatory and are intended to provide further explanation of the invention as claimed.

DETAILED DESCRIPTION

As mentioned above, conventional fused silica refractories made from quartz grains typically contain approximately 2.5 to 3 weight percent calcium oxide binder. The present invention is based on applicants' discovery that calcium oxide binder significantly contributes to the deterioration and wear of conventional silica refractories in furnace environments containing alkali vapors.

Thus, the present invention is based on the discovery that reduction of the amount of calcium oxide binder contained in the silica brick prior to firing results in a brick that is resistant to attack from alkalis in the furnace environment. The refractory material of the present invention is particularly useful for making silica bricks for glass furnaces, particularly glass furnaces that are oxygen-fuel fired.

Conventional fused silica refractory bricks are typically manufactured by mixing together the calcium oxide binder with crystalline quartz grains having the right characteristics for conversion to the high temperature crystal phases of silica. After forming the brick, which is usually done by pressing (e.g., dry pressing), the brick is fired at temperatures high enough to convert the quartz into cristobalite and tridymite, which are stable at high temperatures.

Without being bound to any particular theory, applicants believe that when conventional fused silica bricks containing the usual levels of 2.5 to 3 weight percent calcium oxide are used in furnaces, the high furnace temperatures causes the calcium to react with silica to form pseudo wollastonite or sodium metasilicate. This mineral surrounds the silica grains, and forms a continuous path which apparently acts as pathway for drawing alkali from the furnace deep into the brick. Penetration of the alkali below the face of the brick causes premature corrosion and deterioration of the brick, leading to early failure of the furnace.

The invention is further illustrated by the following non-limiting example.

EXAMPLE

Three samples of silica brick mixes were produced from quartz grains according to customary brick manufacturing procedures. The samples were cylinders measuring 4.5 inches long and 1.5 inches in diameter. These cylinders were inserted into an oxygen fuel fired glass furnace wall to determine the level of alkali penetration beneath the hot face of the sample, i.e., the end of the sample facing the interior of the furnace which is exposed to alkali vapors.

The samples were all made from quartz grain and contained varying amounts of calcium oxide binder. Sample "A" representing a conventional silica refractory, contained approximately 2.7 weight percent added calcium oxide binder. Sample "B" contained approximately 0.7 weight percent added calcium oxide binder. Sample "C" contained approximately 0.1 weight percent calcium oxide binder.

The three samples were placed in a glass furnace for 85 hours and exposed to temperatures of approximately 2800° F. The three samples were then rated from best to worst, based on the extent of penetration of the glass beyond the hot face of each sample. Penetration of the glass was observed by using optical microscopic examination, scanning electron microscope examination and scanning electron microscope energy dispersive analysis.

Sample "A", containing 2.7 weight percent calcium oxide binder, exhibited the deepest and worst penetration of glass beneath the hot face of the sample. Sample "B" and sample "C", respectively exhibited less deep and severe penetration of the glass beneath the hot face of the sample. Thus, the samples containing a lower weight percent of calcium oxide binder exhibited better performance in that the glass did not penetrate the surface of the sample as deep as the conventional silica refractory material containing 2.7 weight percent calcium oxide binder.

It is presently preferred, however, that greater than 0.1 weight percent of calcium oxide binder be added to the mixture of quartz prior to firing, as it was discovered that the sample containing 0.1 weight percent lime did not hold together as well as the sample containing 0.7 weight percent calcium oxide binder. The appropriate amount of calcium oxide binder and the grain size of the quartz can be optimized through experimentation to provide a silica brick having the appropriate strength and resistance to alkali attack for a particular application. Manufacturing procedures for silica refractories made from quartz grains are discussed in U.S. Pat. No. 5,310,708, which is incorporated herein by reference.

Accordingly, the present invention provides a silica refractory brick made from quartz grains and containing calcium oxide binder consisting essentially of silica, and less than one weight percent calcium oxide binder. It is presently preferred that the brick contain between 0.1 and 0.8 weight percent calcium oxide binder, and in a more preferred embodiment, the brick contains between 0.3 and 0.7 weight percent calcium oxide binder. The invention also relates to glass manufacturing furnaces utilizing the bricks of the present invention.

Another aspect of the invention involves a method for producing a silica refractory brick made from quartz grains comprising adding less than one weight percent calcium oxide binder to the composition prior to firing of the brick to prevent degradation of the brick in an oxygen-fuel fired furnace. Still another aspect of the invention relates to a method of preventing the degradation of a silica refractory material made from quartz grains by alkalis in a furnace environment comprising reducing the amount of alkaline earth binder added to the composition to less than about one weight percent.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

What is claimed is:

1. A glass manufacturing furnace incorporating a silica refractory brick made from quartz grains and containing calcium oxide binder consisting essentially of (i) silica; and (ii) between 0.1 and 0.8 weight percent added calcium oxide binder.

* * * * *